United States Patent [19]

Krufka

[11] Patent Number: 4,805,124
[45] Date of Patent: Feb. 14, 1989

[54] SYSTEM AND METHOD FOR MEASURING ELLIPTICAL ELEMENTS

[75] Inventor: Frank S. Krufka, Mount Joy, Pa.

[73] Assignee: RCA Licensing Corp., Princeton, N.J.

[21] Appl. No.: 60,147

[22] Filed: Jun. 10, 1987

[51] Int. Cl.$^4$ .............................................. H04N 7/18
[52] U.S. Cl. .................................. 364/560; 358/107; 356/384
[58] Field of Search ........................ 364/560, 563, 562; 356/387, 384; 358/107

[56] References Cited

U.S. PATENT DOCUMENTS

| | | | |
|---|---|---|---|
| 4,480,264 | 10/1984 | Dushl | 358/10 |
| 4,497,066 | 1/1985 | Gasparri, Jr. | 382/48 |
| 4,525,735 | 6/1985 | Krufka | 358/10 |
| 4,555,798 | 11/1985 | Broadbent, Jr. et al. | 382/8 |
| 4,556,902 | 12/1985 | Krufka | 358/107 |
| 4,597,009 | 6/1986 | Ballmer et al. | 358/93 |
| 4,684,982 | 8/1987 | Krufka | 358/107 |
| 4,717,955 | 1/1988 | Krufka | 358/107 |
| 4,730,213 | 3/1988 | Kelly, III et al. | 358/107 |
| 4,730,263 | 3/1988 | Mathis | 364/571 |
| 4,748,330 | 5/1988 | Krufka | 250/560 |

FOREIGN PATENT DOCUMENTS

| | | | |
|---|---|---|---|
| 0118067 | 10/1978 | Japan | 364/560 |
| 0044985 | 3/1980 | Japan | 356/387 |

Primary Examiner—Parshotam S. Lall
Assistant Examiner—S. A. Melnick
Attorney, Agent, or Firm—E. M. Whitacre; D. H. Irlbeck; L. L. Hallacher

[57] ABSTRACT

The major/minor dimensions of elliptical elements are measured by simultaneously scanning both dimensions of the elements and arranging the data in a matrix for each of the dimensions. A first preselected number of the largest elements are arranged or averaged for one dimension to obtain an average for one of the dimensions. A second predetermined number of largest elements are averaged for the other dimension to obtain an average for the other dimension. The measured dimensions are compared with upper and lower limits to verify the acceptability of the dimensions.

8 Claims, 5 Drawing Sheets

SYSTEM AND METHOD FOR MEASURING ELLIPTICAL ELEMENTS

BACKGROUND

This invention relates generally to the measurement of elliptical elements on a medium and particularly to the measurement of the dots in a kinescope faceplate panel, or shadow mask.

During the production of picture tubes for color television receivers, a black matrix material is applied to the inside surface of the faceplate panels. The black matrix coating includes a large number of transparent dots which are arranged in a particular pattern. The transparent dots are coated with slurries of photosensitive materials including phosphors which emit the three primary colors of light when impacted by electrons. The phosphors are alternately applied in a repetitive sequence such as red, green, blue, to the transparent dots. Prior to the application of the phosphors, it is desirable to measure the widths of the transparent dots, and the opaque matrix spaces between the dots, to verify, that they are within acceptable dimensional tolerances to avoid the expensive application of phosphors to improperly matrixed panels.

In order to measure the transparent dots, and the opaque spaces between the dots, the faceplate panel is placed between a stationary light source and a detector enabling light to pass through the dots to the detector. Portions of the panel are scanned with light and variations in the light transmission capabilities of the opaque spaces and the transparent dots are detected and provided to a measuring system.

Typically, the detector is a photosensitive solid state device, such as a linear photodiode array or a CCD. The pixels of the array are charged to various levels in accordance with the amount of light impacting the individual pixels. A camera is used to focus the matrix dot pattern onto the array. The camera lens focuses and magnifies the image so that each dot spans a number of detector pixels. Scanning is affected by rotating a galvo to change the portion of the dot pattern which is focused onto the array. The pixel charge levels are periodically clocked out to effectively scan a large number of lines across the dot pattern.

Ordinarily the dot measuring data are gathered from selected portions of the panel rather than from the entire panel. Accordingly, measurements typically are made at the four corners and center of the panel. The dot patterns on the faceplate screens are made by photoexposing the photosensitive materials through an apertured element, called a shadow mask. Accordingly, the light rays which pass through the apertures in the shadow mask to expose the photosensitive materials, strike the photosensitive material at different angles. This causes the dot elements which are in the proximity of the corners of the panel to be elliptically shaped rather than circular, as is desired. For this reason, for high definition television tubes, the dimensions of the dot elements must be measured along both the major and minor axes of the elements. Accordingly, in order to ensure that all the measurements can be made in the time allotted for each panel, typically 15 seconds, it is necessary to simultaneously scan all the selected areas along both the major and minor axes of the elliptical elements and to gather the data separately for each of the dimensions and for each of the measuring areas. For these reasons, there is a need for a system for simultaneously measuring elliptical patterns along both the major and minor dimensions of the elliptical patterns. The present invention fulfills this need.

CROSS-REFERENCE TO RELATED APPLICATION

The present invention can be used along with the invention described in application Ser. No. 856,008 filed Apr. 25, 1986 by Frank S. Krufka entitled "Method For Measuring Transparent Elements In An Opaque Medium" now U.S. Pat. No. 4,730,213.

SUMMARY

A method of measuring orthogonal dimensions of elliptical elements having a first energy transmission capability in a medium having a second energy transmission capability includes the steps of illuminating the elements and the medium with energy whereby one of the transmission capabilities substantially passes the energy and the other of the transmission capabilities substantially blocks the energy. Arranging at least two multipixel energy detectors at substantially right angles and simultaneously individually scanning a number of scan lines across the energy detectors for a selected number of elliptical elements whereby pixels receiving energy from areas having the first transmission capability charge to a first level and pixels receiving energy from areas having the second transmission capability charge to a second level. The charge levels from the detectors are detected to produce two analog signals having first and second amplitudes respectively indicative of the first and second charge levels. The analog signals are converted to digital signals having first and second pixel counts whereby a first of the dimensions is represented by the first pixel count and the second of the dimensions is represented by a second pixel count. The pixel counts for the first dimension are stored in a first matrix including a column of pixel counts for each of the selected elliptical elements and a row of pixel counts for each of the scan lines. The n highest pulse counts in each of the columns are selected and averaged to obtain an average column pixel count for the elliptical elements in the first direction. The pixel counts for the second dimension are stored in a second matrix including a column of pixel counts for each of the selected elliptical elements and a row of pixel counts for each of the scan lines. The m highest pulse counts in each of said columns are selected and averaged to obtain an average column pixel count for the elliptical elements in the second direction. The average column pixel counts for both directions are averaged to obtain dimension pixel counts for both directions.

DETAILED DESCRIPTION

Figure 1:
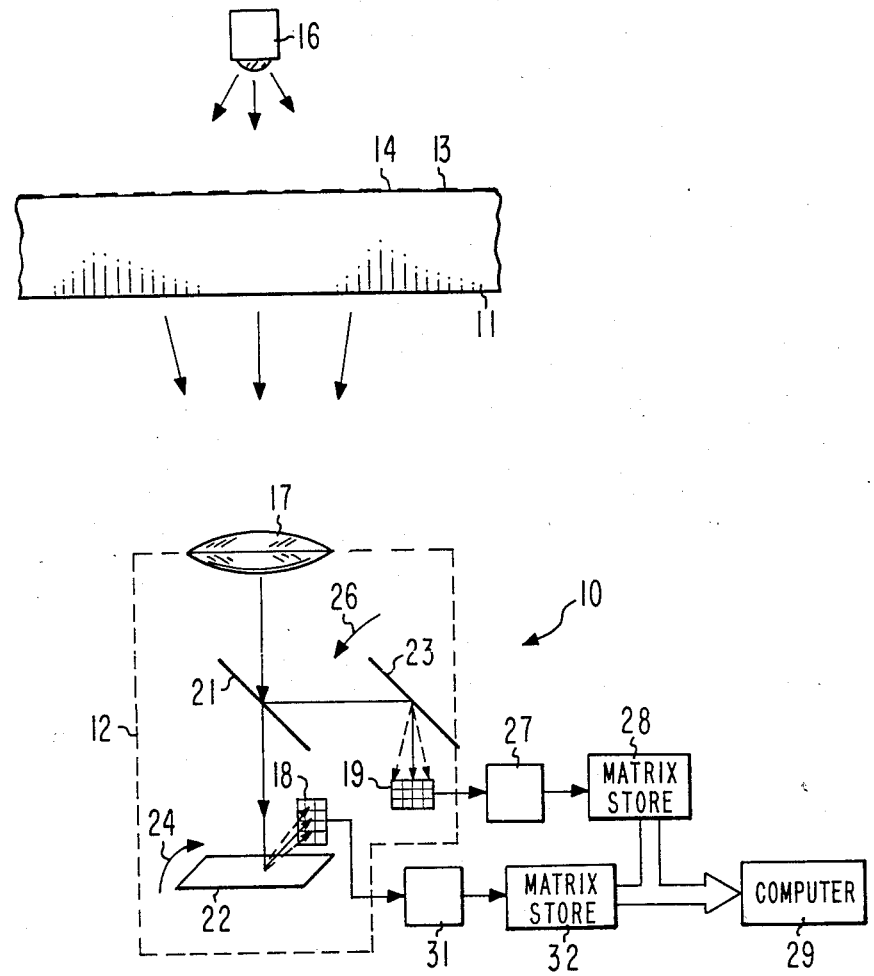
FIG. 1 is a simplified showing of a system for simultaneously scanning elliptical elements in two orthogonal directions and for supplying matrix data to a computer for each individual scanning direction.

In FIG. 1, a system 10 for inputting measuring data from a kinescope faceplate 11 includes a camera 12. A black matrix coating 13 is applied to the inside surface of the faceplate panel 11 leaving a large number of transparent dots 14 in the matrix material 13. A light source 16 illuminates a portion of the matrix and, thus, a plurality of the transparent dots 16 so that the energy passes through the dots 14 to the camera 12. The camera 12 includes a lens 17 which is movable to focus the light on two orthogonally arranged detectors 18 and 19. The detectors 18 and 19 can be photodiode arrays or CCDs. A beam splitter 21 is arranged between the lens 17 and two galvos 22 and 23. Accordingly, light from the lens is split fairly equally to the two galvos 22 and 23 by the beam splitter 21. The galvo 22 is rotatable about an axis parallel to the plane of paper as indicated by the arrow 24. The galvo 23 is rotatable about an axis perpendicular to the plane of the paper as indicated by the arrow 26. Accordingly, simultaneous rotation of the galvos 22 and 23 causes the light emanating through the panel 11 and focused by the lens 17 to be scanned across the detectors 18 and 19 simultaneously so that both the minor and major axes of the elliptical elements 14 within the panel 11 are simultaneously scanned. Simultaneous scanning of the detectors 18 and 19 is necessary in order to collect measuring data with respect to both the major and minor axes of the elements 14 within the screen 11 to permit time for measuring both dimensions of the elements 14 in the time provided to inspect one panel, which typically is 15 or less seconds.

The energy detectors 18 and 19 are multipixel detectors and the lens 17 greatly magnifies the pattern focused onto the detectors. Accordingly, each dimension of the aperture elements 14 covers a plurality of pixels within each of the sensors 18 and 19. Each of the detectors 18 and 19, therefore, produces an analog signal having first and second amplitudes which respectively are indicative of the charge levels of the pixels on the detectors 18 and 19. The black matrix material 13 is substantially opaque to the light while the elliptical elements 14 are substantially transparent to the light from the light source 16. Accordingly, pixels of the detectors 18 and 19 charge to first and second charge levels in accordance with the transmission capabilities of the black matrix 13 and the elliptical elements 14.

The analog signal from the detector 19 is provided to an array interface circuit 27 where the analog signal is converted to a digital signal having first and second pulse levels in accordance with the first and second amplitudes of the analog signal. The number of pixels illuminated through the elliptical elements 14 thus is a pulse count representative of one dimension of the elliptical elements 14. This pulse count is supplied to a matrix store 28 where the pulse counts are stored prior to being input to a computer 29, when the computer is available to receive incoming data. The detector 18 provides an analog signal to an array interface circuit 31 which receives pulse counts indicative of the number of pixels illuminated along the other dimension of the elements 14 on the faceplate 11. The output of the array interface circuit 31 is provided to a matrix store 32 where the data representative of the dimension of the other axis of the elements 14 are stored prior to being input to the computer 29.

Figure 2:
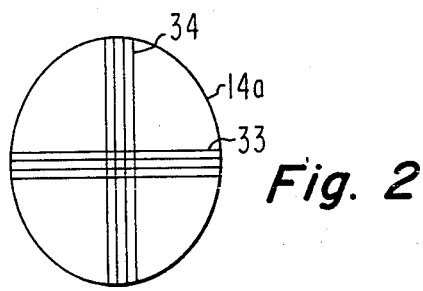
FIG. 2 is a simplified showing of an elliptical element and the scanning with respect to such element.

FIG. 2 shows one elliptical element 14a which is greatly exaggerated in both size and ellipticity. Typically, in measuring the dimensions of the elements 14 on the panel 11, five of the cameras 12 and five of the light sources 16 are used to gather data from five selected areas on the panel 11. Each of the cameras 12 is focused so that a plurality, such as six, of the elliptical elements 14 are focused onto each of the detectors 18 and 19. The galvos 22 and 23 are simultaneously incremented to scan the light from the focusing lens 17 across the detectors 18 and 19 so that a plurality of scan lines are simultaneously scanned across both the minor and major dimensions of the elliptical elements 14. Thus, for example, a large number of scan lines 33 are scanned parallel to the minor axes of the optical element 14a. Also, a large number of scan lines 34 are scanned substantially parallel to the major axes of the elliptical element 14a. Thus, each of the major and minor dimension scan lines 33 and 34 contain numbers of pulse counts in accordance with the number of pixels illuminated through the elliptical elements 14 and as determined by the major and minor dimensions of the elliptical elements. The pixel counts for the scan lines are stored in the matrix stores 28 and 32 prior to being input the computer 29. Typically, the number of scan lines 33 and 34 for each elliptical element is a large number, such as 50. Also, typically, a number, such as six, of the optical elements 14 are simultaneously scanned. Thus, the matrix store 28 temporarily stores the pulse counts for 50 of the minor dimension scan lines 33 for each of the six elliptical elements 14. Similarly, the matrix store 32 stores the data representative of 50 of the scan lines 34, also for the six elliptical elements 14 scanned. When the computer receives the incoming data from the matrix stores 28 and 32 the data from the matrix store 28 are arranged in a matrix having 50 rows for each of the scan lines 33 and a number of columns equal to the number of elliptical elements scanned, such as the exemplary six. Similarly, the data stored in the matrix store 32 are put into a matrix format by the computer 39 having a number of rows 50 for each of the scan lines 34 and a number of columns equal to the number of elliptical elemnts 14, again such as the exemplary six. These data are arranged in a matrix format as shown in Tables I and II.

TABLE I

| | MINOR AXIS PULSE COUNTS | | | | | |
|---|---|---|---|---|---|---|
| | C1 | C2 | C3 | C4 | C5 | C6 |
| R1 | 48 | 45 | 51 | 49 | 47 | 49 |
| R2 | 49 | 49 | 49 | 46 | 44 | 51 |
| R3 | 46 | 48 | 48 | 45 | 49 | 46 |
| . | . | . | . | . | . | . |
| . | . | . | . | . | . | . |
| . | . | . | . | . | . | . |
| R50 | 50 | 44 | 46 | 51 | 48 | 49 |

TABLE II

| | MAJOR AXES PULSE COUNTS | | | | | |
|---|---|---|---|---|---|---|
| | C1 | C2 | C3 | C4 | C5 | C6 |
| R1 | 58 | 59 | 60 | 61 | 58 | 60 |
| R2 | 61 | 58 | 61 | 59 | 59 | 59 |
| R3 | 60 | 59 | 58 | 56 | 58 | 57 |
| . | . | . | . | . | . | . |
| . | . | . | . | . | . | . |
| . | . | . | . | . | . | . |
| R50 | 59 | 60 | 57 | 58 | 60 | 59 |

Briefly stated, in operation the minor dimension of the elliptical patterns 14 is measured by averaging the highest pixel counts for a selected number n of scan lines for each of the elliptical elements 14 to obtain an average column minor dimension pixel count. The average column minor dimension pixel counts are then averaged to obtain an average array pixel count for the minor dimension of the elliptical elements 14. The average array pixel count is converted to a linear dimension utilizing the known dimensions of the pixels within the detector 18 and the magnification factor of the camera 12. The linear dimension is compared to upper and lower, minor limit values to determine the acceptability of the minor dimension of the elliptical elements 14. The process is repeated for the major dimension. However, the number of scan lines m for this dimension is usually less than that for the other dimension, for example n can be 5 and m can be 2.

FIGS. 3a to 3d are a flow chart of the data manipulation employed in utilizing the claimed method in calculating the major and minor dimensions of the elliptical elements 14. The dimensional calculation starts at step 37 and at step 38 the first column of the x axis, or minor dimension of the data matrix in Table I is selected for processing. In step 39 the first five row values R1 to R5 in Table I are selected as the five largest values for the minor axis dimension. At step 40 the selection is incremented to the next succeeding row within column 1. At step 41 the pixel count value in row 6 (R6) of column 1 is compared to the pixel count in row 1 (R1) column 1 to determine which is the higher. When R1 pixel count value is the highest, step 42 is entered to compare the R6 value with the R2 value. When the R2 value is the highest step 43 is entered to compare the R6 value with the R3 value. As long as the R6 value remains lower than any of the values of R1, steps 41 through 45 are completed and the R6 value is discarded as one of the five highest pixel counts measured in any of the rows of data.

Returning to step 41, when the R6 value exceeds the R1 value, step 46 is entered to replace the R1 value with the R6 value. However, the R1 value can exceed either the R2, R3, R4 or R5 value and the intent is to retain the five highest values. Accordingly, steps 51 through 55 are entered to determine whether or not the R1 value exceeds either the R2, R3, R4 or R5 values. When the R1 value does exceed either of the R2 through R5 values, steps 56 through 60 are entered depending upon which value is exceeded to replace the smaller value with the larger R1 value.

Steps 47 through 50 are used in the same manner as step 46, to check an exceeded R value against the other remaining four R values to assure the five highest R values are retained.

Figure 3A:
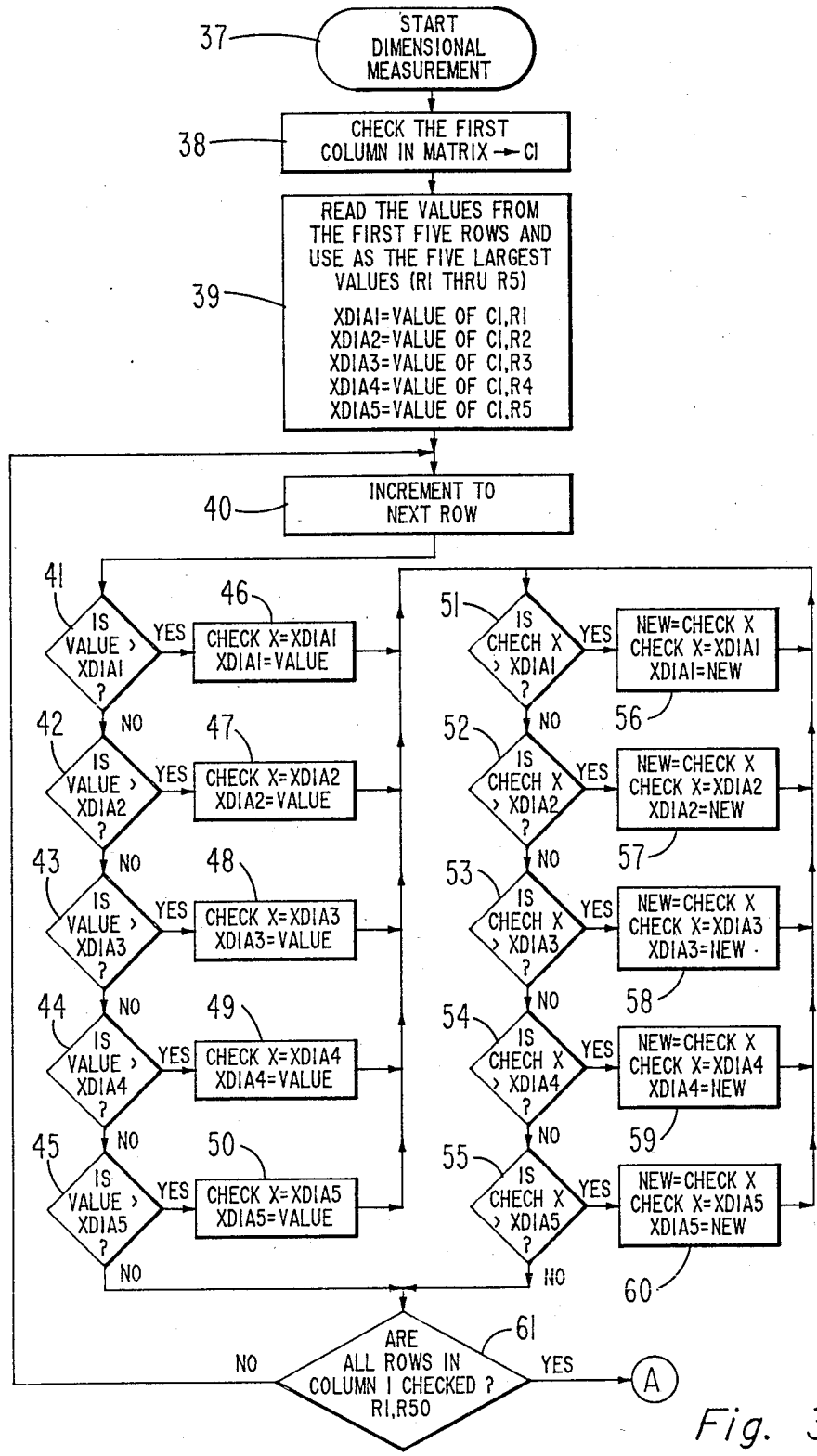
FIGS. 3a to 3d are a flow chart of a preferred embodiment of the present invention.
Figure 3B:
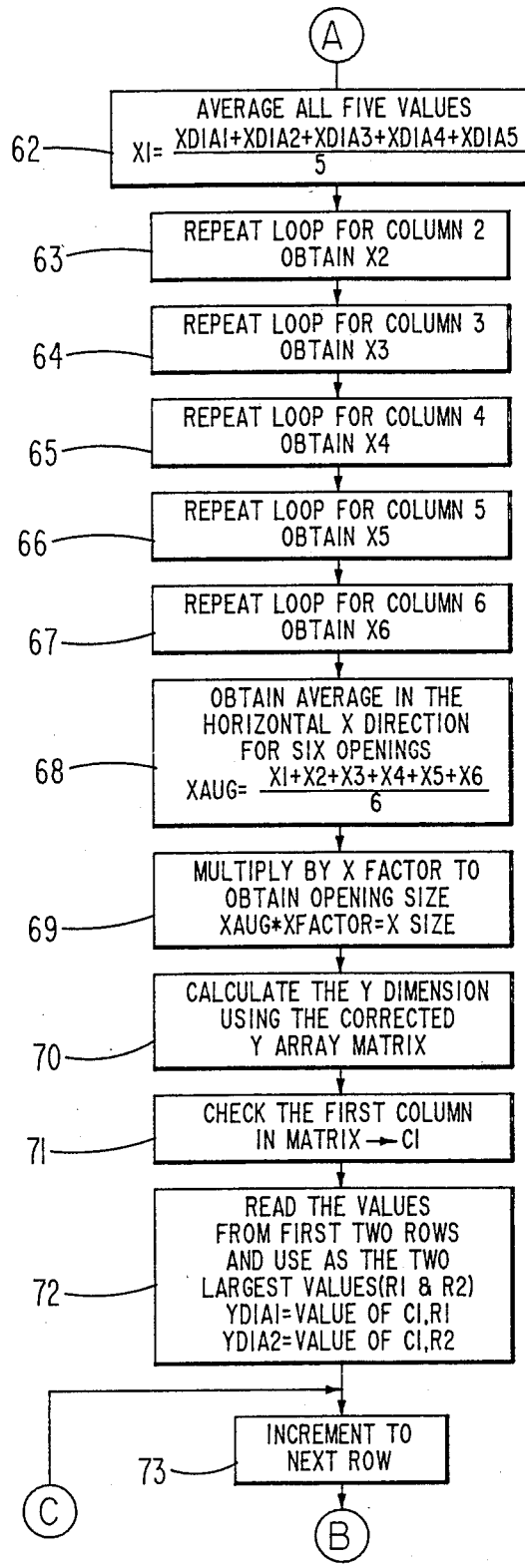

After all the comparisons accomplished in steps 41 through 60 are completed, step 61 is entered to determine whether or not the last row of data in the column being considered has been checked. When all rows have not been checked, step 40 of FIG. 3a is reentered to increment to the next row to repeat all of steps 41 through 60. When step 61 shows that all rows in a particular column have been checked step 62 in FIG. 3b is entered to average the five highest values found in the column being checked to obtain an average column pixel count. Step 63 is then entered to repeat the full loop consisting of steps 41 through 60 for the next column of data. At the completion of averaging the five highest values in the second column of data steps 64 through 67 are sequentially entered to repeat the process and obtain the average column pixel counts for columns 3, 4, 5 and 6.

Upon the completion of step 67, step 68 is entered to average the six average column pixel counts and obtain an average array pixel count for the minor dimension of the elliptical elements. Step 69 is then entered to multiply the average pixel count by a multiplication factor to determine the actual dimension in the minor axis direction. The multiplication factor is a function of the magnification of the lens, the known dimensions of the pixels of the detector, and thus is dependent upon system parameters.

Step 70 is next entered to begin the calculation of the major or Y-dimension of the elliptical elements in the matrix array of Table II. Step 71 is entered to select the first column of data in Table II. Step 73 is then entered and the first two rows of pixel counts are used as the largest pulse count values for that column. Step 73 is then entered to increment to the next row of data in the major axis matrix. In step 74 of FIG. 3c the next row of data are compared to the first stored value to determine whether or not it is larger than the first stored value. When it is not larger than the first stored value, step 75 is entered to compare the new incoming data to the second stored value. When it is not larger step 82 is entered to determine whether or not all rows of data have been checked. Returning to step 74, when the pulse count being checked is greater than the stored R1 value step 76 is entered to discard the R1 value and replace it with the pulse count value being checked. Step 78 is then entered to determine whether or not the discarded R1 pulse count is smaller than the other stored pulse count. Thus, step 74 through 81 are used to retain the two highest pulse counts in each column of data.

Figure 3C:
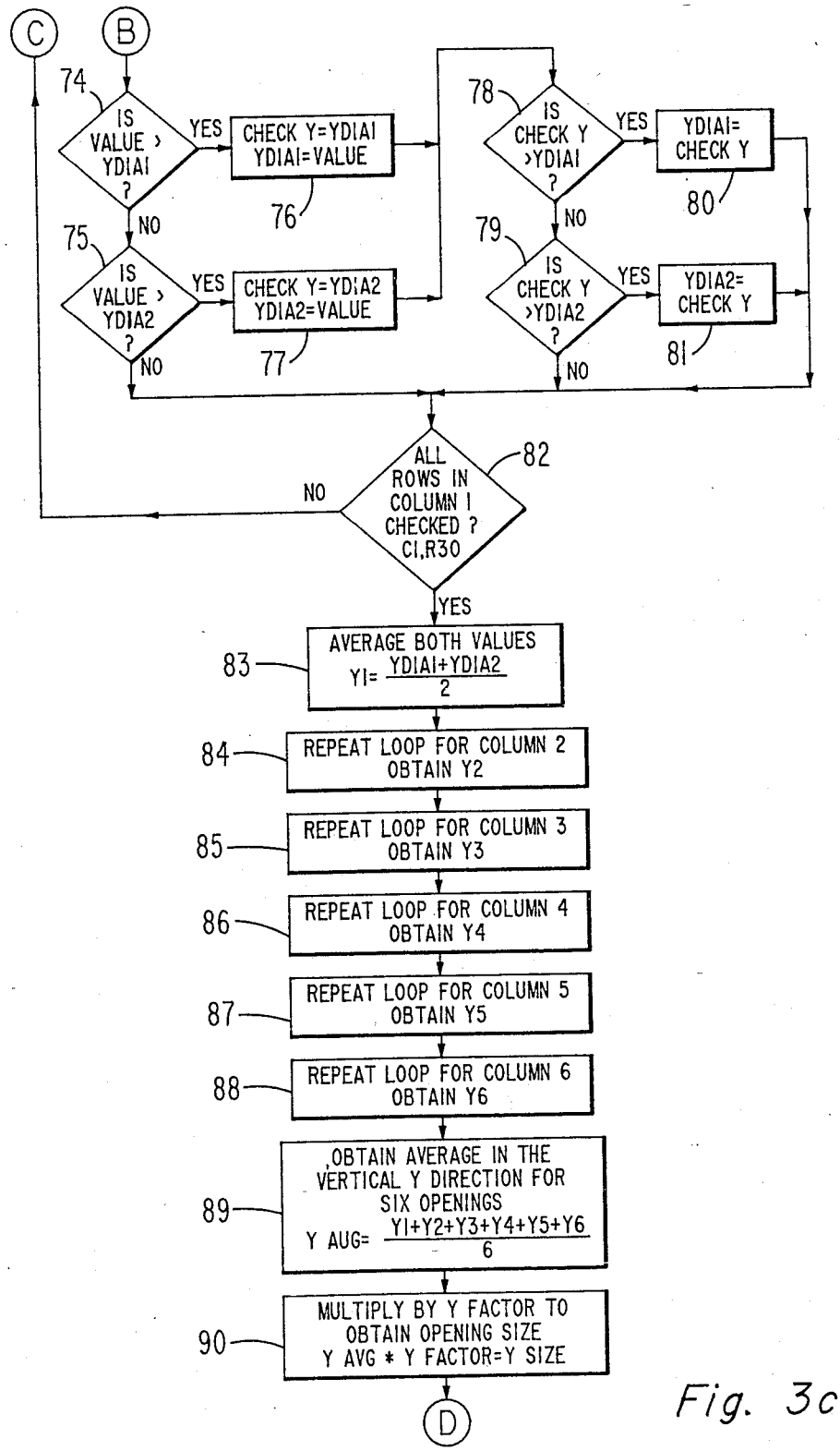

When all rows for a particular column have been checked in step 82, step 83 of FIG. 3c is entered to obtain the average major axis column pixel count for the column of data being considered. Steps 84 through 88 are then sequentially entered to repeat the comparisons for each of the columns of data of columns 2 through 6 in the same manner as column 1 was checked in steps 74 through 82. Upon the completion of the average column major axis pixel counts for all six columns of elements, step 89 is entered to average the average column pixel counts to obtain the average array major axis pixel counts for the elliptical openings. Step 90 is then entered to multiply the average major axis count by the multiplication factor, which again is determined by the magnification of the camera and the pixel size of the detector.

Figure 3D:
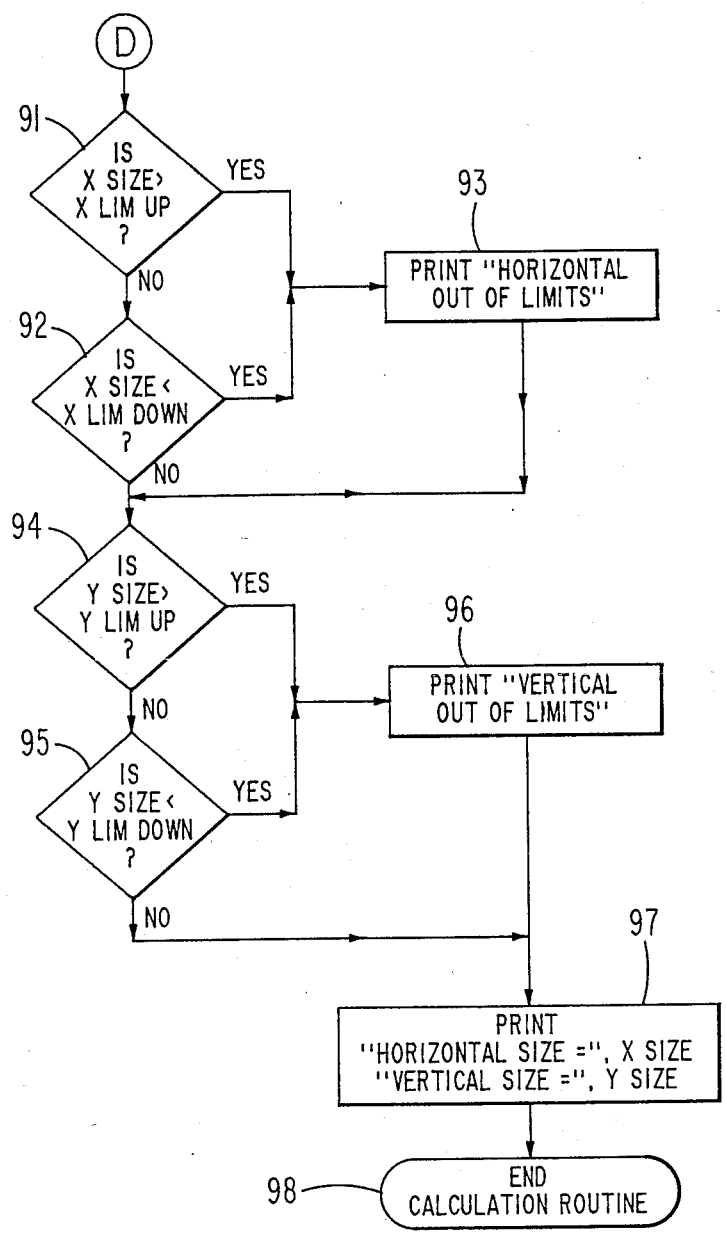

Step 91, of FIG. 3d, is next entered to determine whether or not the calculated minor axis dimension exceeds the upper limit. When it does, step 93 is entered to print out that the horizontal, or minor axis, dimension is out of limits. In step 91 when the minor axis dimension is permissible step 92 is entered to determine whether or not the minor axis dimension is less than the smallest permissible limit. When it is, again step 93 is entered to indicate that the minor dimension is out of limits.

When the minor axis dimension is found to be within the acceptable limits, steps 94 and 95 are sequentially entered to determine whether or not the major axis dimension is also within allowable limits. When it is not, step 96 is entered to indicate that the major axis dimension is out of limits. When the major axis dimension is within limits, step 97 is entered to print out both the major and minor axis dimensions of the elliptical aperture elements and the routine is ended at step 98.

What is claimed is:

1. A method of measuring orthogonal dimensions of elliptical elements having a first energy transmission capability in a medium having a second energy transmission capability including the steps of:

illuminating said elements and said medium with energy whereby one of said transmission capabilities substantially passes said energy and the other of said transmission capabilities substantially blocks said energy;

arranging at least two multipixel energy detectors at substantially right angles and simultaneously individually scanning a number of scan lines across said energy detectors for a selected number of said elliptical elements in orthogonal directions substantially parallel to said orthogonal dimensions, whereby pixels receiving energy from areas having said first transmission capability charge to a first level and pixels receiving energy from areas having said second transmission capability charge to a second level;

detecting said charge levels from said detectors to produce two analog signals having first and second amplitudes respectively indicative of said first and second charge levels;

converting said analog signals to digital signals having first and second pixel counts whereby a first of said dimensions is represented by said first pixel count and the second of said dimensions is represented by said second pixel count;

storing said first pixel counts for said first dimension in a first matrix wherein said first matrix includes a column of pixel counts for each of said selected elliptical elements and a row of pixel counts for each of said scan lines;

selecting and averaging the n highest pxel counts in each of said columns to obtain an average first direction column pixel count for said elliptical elements in said first direction;

averaging said first direction column pixel counts to obtain an average first direction array pixel count for said first direction;

storing said pixel counts for said second dimension in a second matrix wherein said second matrix includes a column of pixel counts for each of said selected elliptical elements and a row of pixel counts for each of said scan lines;

selecting and averaging the m highest pixel counts in each of said columns to obtain an average second direction column pixel count for said elliptical elements in said second direction;

averaging said second direction column pixel counts to obtain an average second direction array pixel count for said second direction; and multiplying said average pixel count for said first direction by a first conversion factor to convert said pixel count to a first linear dimension; and multiplying said average pixel count for said second direction by a second conversion factor to convert said pixel count to a second linear dimension.

2. The method of claim 1 wherein said first and second conversion factors are equal.

3. The method of claim 1 wherein said first dimension is parallel to the minor axis of said elliptical element and said second dimension is parallel to the major axis of said elliptical element.

4. The method of claim 3 further including the steps of comparing said first and second dimensions to first and second limits to verify the acceptability of said elliptical elements.

5. The method of claim 4 wherein said elliptical elements are the dots for a kinescope having a screen and said medium is said screen.

6. The method of claim 3 where n is greater than m.

7. A system for measuring orthogonal dimensions of a preselected number of elements arranged on a medium comprising:

an energy source for illuminating said elliptical elements and said medium with energy;

means for receiving energy from said elements and from said medium, said means for receiving including at least two orthogonally arranged multipixel detectors and means for simultaneously scanning a plurality of scan lines of said received energy across said detectors whereby pixels receiving energy from said elements charge to a first level and pixels receiving energy from said medium charge to a second level to produce first and second signals having amplitudes in accordance with said charge levels; and widths in accordance with said element dimensions;

first and second means individually responsive to said first and second signals for producing first and second digital signals having pixel counts individually indicative of said element dimensions;

first and second storage means for individually and respectively receiving said first and second digital signals and storing said pixel counts in rows and columns, each of said rows having said pixel counts for each of said scan lines and each of said columns having pixel counts for each of said selected elements;

computer means responsive to said first and second storage means, said computer means including;

first means for selecting the n highest pixel counts in each column of said first storage means and for averaging said n highest pixel counts to produce first average column pixel counts;

first means for averaging said first average column pixel counts for producing an average dimension pixel count for one of said dimensions;

second means for selecting the m highest pixel counts in each column of said second storage means and for averaging said m highest pixel counts to produce second average column pixel counts;

second means for averaging said second average column pixel counts for producing an average dimension pixel count for the other of said dimensions; and means for multiplying said average dimension pixel counts by a conversion factor to provide said dimensions.

8. The system of claim 7 further including means for comparing said dimensions with stored upper and lower limits for each of said dimensions.

* * * * *